(12) United States Patent
Kawamura

(10) Patent No.: US 6,381,697 B1
(45) Date of Patent: *Apr. 30, 2002

(54) ELECTRONIC EQUIPMENT, METHOD OF CONTROLLING OPERATION THEREOF AND CONTROLLING METHOD

(75) Inventor: Harumi Kawamura, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/401,061

(22) Filed: Sep. 22, 1999

Related U.S. Application Data

(63) Continuation of application No. 09/296,090, filed on Apr. 21, 1999, now Pat. No. 6,247,132, which is a continuation of application No. 08/690,368, filed on Jul. 26, 1996, now abandoned.

(30) Foreign Application Priority Data

Jul. 28, 1995 (JP) ............................................. 7-212633
Aug. 4, 1995 (JP) ............................................. 7-219776

(51) Int. Cl.⁷ ............................ H04L 9/00; G06F 13/42
(52) U.S. Cl. ........................ 713/162; 380/240; 710/106
(58) Field of Search ................................. 380/277, 201, 380/240; 370/490, 486; 710/9, 10, 11, 16, 14, 105, 106; 713/168, 162; 705/57

(56) References Cited

U.S. PATENT DOCUMENTS

| 4,866,769 A | | 9/1989 | Karp |
| 4,918,690 A | | 4/1990 | Markkula et al. |
| 5,193,208 A | * | 3/1993 | Yokota et al. ............... 455/4.1 |
| 5,758,070 A | * | 5/1998 | Lawrence ................... 709/220 |
| 5,815,678 A | * | 9/1998 | Hoffman et al. ............ 710/129 |

FOREIGN PATENT DOCUMENTS

| EP | 0 580 367 | 1/1994 |
| EP | 0 640 924 | 3/1995 |
| EP | 0 689 296 | 12/1995 |

OTHER PUBLICATIONS

Mueller, R., "LON—Das Universelle Netzwerk Teil 1. Ein Neuartiges Konzept, um Steuergeraete,Sensoren und Aktoren miteinander sprechen zu lassen"; Elektronik, DE, Franzis Verlag, Munchen, vol. 40, Nr. 22, pp. 59–62, 64–65, XP000268228.

Pinto, J J: "Truly Distributed Control Systems Through Intelligent, Networked I/O", Advanced in Instrumentation and Control, US, Instrument Society of america, vol. 48, NR. Part 02, pp. 969–976 XP000435400.

Hoffman G et al., "*IEEE 1394: A ubiquitous Bus*".Compcon, Technologies for the Information Superhighway San Francisco, No. Conf. 40, 1995, pp. 334–338, XP000545446.

* cited by examiner

*Primary Examiner*—Gilberto Barron, Jr.
(74) *Attorney, Agent, or Firm*—Frommer Lawrence & Haug LLP; William S. Frommer; Gordon Kessler

(57) ABSTRACT

A method and apparatus for controlling communication between components connected to a bus. All equipment manufacturers may use every application available on each connected apparatus by using a unique vendor command in accordance with the IEEE-1394 standard. A controller, when accepting a target key code, calculates an application key code based on a cipher function and a target key code therefor. Then, an opening command is transmitted for the application associated with the application key code. The target apparatus, when accepting the opening command, decodes the target key code in the command. If the result of decoding is equal with the target key code of its own, an application is placed in an executable open state.

8 Claims, 15 Drawing Sheets

CTS: Command Transaction Set

CT/RC: Command Type/Response Type

Header Address: Destination of Command, Response Sending Subdevice (or Device)

OPC: Operation Code

OPR: Operand

| Application No | Type of Application |
|---|---|
| 00h | (Use Inhibited) |
| 01h | VCR Control (Base) |
| 02h | VCR Control (Special) |
| 03h | Tuner Control |
| ⋮ | ⋮ |
| 10h | Edition Information |
| ⋮ | ⋮ |
| kkh | Application K |
| ⋮ | ⋮ |
| FEh | |
| FFh | (reserved) |

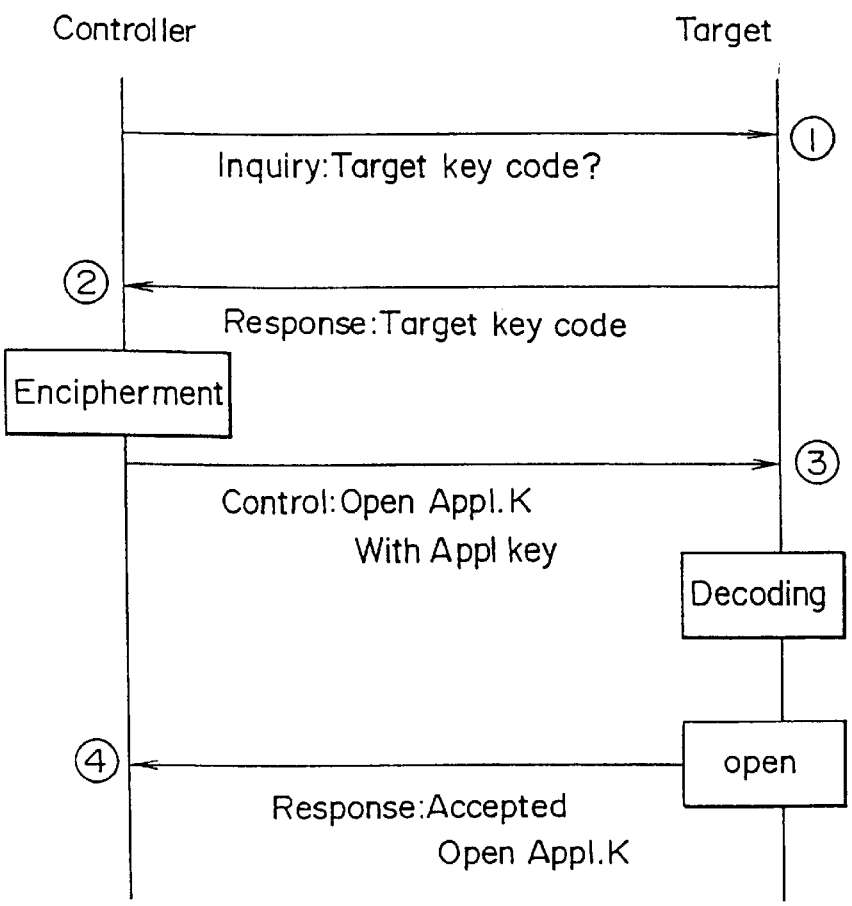

FIG. 7

| OPR4 | OPR5 | OPR6 | OPR7 | OPR8 |
|---|---|---|---|---|
| kk h (Appl. K) | 10 h (Target key) | 71 h (Value Inq) | FF h (dummy) | FF h (dummy) |

(a) Status Inquiry Command

| kk h (Appl. K) | 10 h (Target key) | 71 h (Value Inq) | 12 h | 34 h |
|---|---|---|---|---|
| | | | (Target key code) | |

(b) Response Stable

| kk h (Appl. K) | 10 h (Target key) | 71 h (Value Inq) | FF h (dummy) | FF h (dummy) |
|---|---|---|---|---|

(c) Response Not Implemented

FIG. 8

| kk h (Appl. K) | 60 h (open/close) | 01 h (open) | 56 h (Application | 78 h key code) |
|---|---|---|---|---|

(a) Control Command

| kk h (Appl. K) | 60 h (open/close) | 01 h (open) | 56 h (Application | 78 h key code) |
|---|---|---|---|---|

(b) Response Accepted

| kk h (Appl. K) | 60 h (open/close) | 01 h (open) | 56 h (Application | 79 h key code) |
|---|---|---|---|---|

(c) Control Command

| kk h (Appl. K) | 60 h (open/close) | 01 h (open) | 56 h (Application | 79 h key code) |
|---|---|---|---|---|

(d) Response Accepted

FIG. 9

| kk h (Appl. K) | 60 h (open/close) | FF h (dummy) | 56 h 78 h (Application key code) |
|---|---|---|---|

(a) Status Inquiry Command

| kk h (Appl. K) | 60 h (open/close) | 01 h (open) | 56 h 78 h (Application key code) |
|---|---|---|---|

(b) Response Accepted

FIG. 10

| kk h (Appl. K) | 60 h (open/close) | 00 h (close) | 56 h 78 h (Application key code) |
|---|---|---|---|

| Application No | Company ID of A Company Having A Right of Use |
|---|---|
| 1 | x x x x x x h |
| 2 | x x x x x x h,  y y y y y y h |
| ⋮ | ⋮ |
| K | x x x x x x h,  y y y y y y h |
| ⋮ | |

| Target key code | Application key code |
|---|---|
| 1234 h | 5678 h |
| 0088 h | 0041 h |
| 3333 h | 9999 h |
| ⋮ | ⋮ |

CTS: Command Transaction Set
T/RC: Command Type/Response Code
Header Address: Designation of Command,
　　　　　　　　Response Sending Subdevice
　　　　　　　　(or Device)
OPC: Operation Code
OPR: Operand

FIG. 16
| WORD 0 | WORD 1 | WORD 2 | WORD 3 | WORD 4 | WORD 5 | WORD 6 | WORD 7 |
|---|---|---|---|---|---|---|---|
| Command | | Status of Peripheral Equipment | | VCR Mode | VCR Status/Counter | | |
FIG. 17
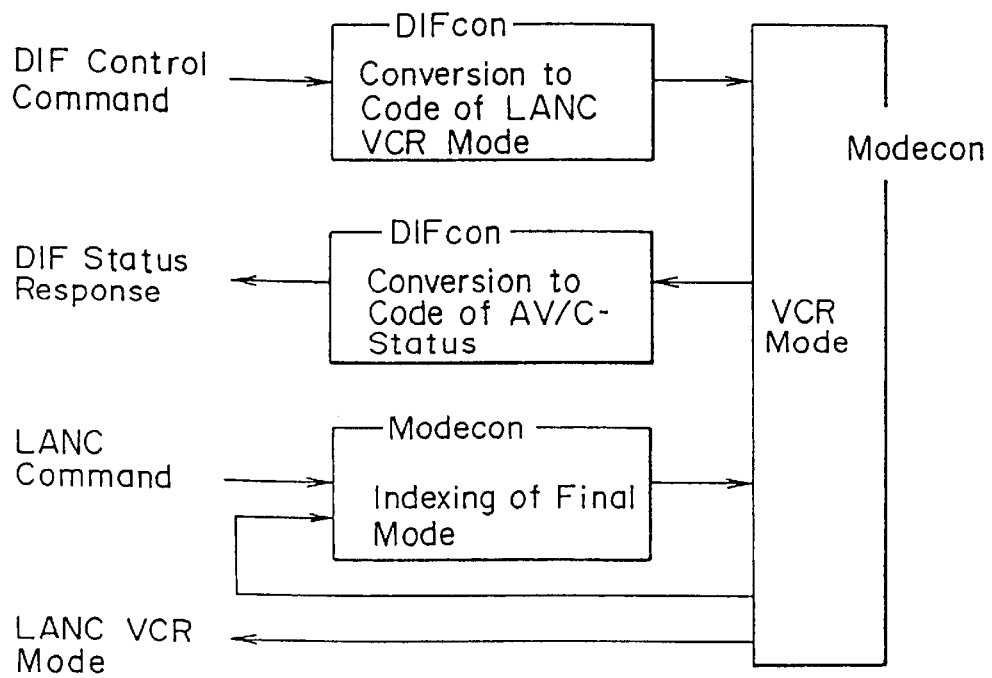
FIG. 19
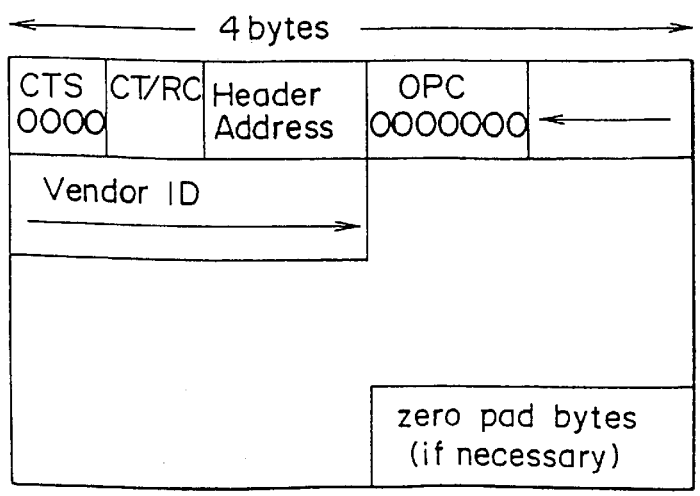

FIG. 18

| VCR Mode | Command |  |  |  |  |  |  |
|---|---|---|---|---|---|---|---|
| | STOP-on | PAUSE-on | PLAY-on | REWIND-on | REWIND-off | FF-on | FF-off | REC-on |

| VCR Mode | STOP-on | PAUSE-on | PLAY-on | REWIND-on | REWIND-off | FF-on | FF-off | REC-on |
|---|---|---|---|---|---|---|---|---|
| STOP | | | PLAY | REWIND | | FF | | REC |
| FF | STOP | | PLAY | REWIND | | | | |
| REC | STOP | REC PAUSE | | | | CUE*1 | | |
| PLAY | STOP | PB PAUSE | | REVIEW | | CUE | | |
| PB PAUSE | STOP | PLAY | PLAY | REVIEW | | CUE | | REC PAUSE |
| REC PAUSE | STOP | REC | PB PAUSE*1 | | | | | *3 |
| CUE | | | | | (Past Mode*2) | | (Past Mode*2) | |
| REVIEW | | | PLAY | REVIEW*1 | | FF | | |
| REWIND | STOP | | PLAY | | | | | |

*1 Not Accepted If Technically Imposible
*2 Return to Mode Before Transition to Current Mode
*3 Conduct Automatic Control for The Type of Conducting Recording for Several Frames and Then Returning to REC PAUSE Is Conducted for Equipment Having Frame Shot Function

FIG. 20

| OPR4 | OPR5 | OPR6 | OPR7 | |
|---|---|---|---|---|
| Application No | OPC Defined on Every Application | OPR1 Defined on Every Application | OPR2 Defined on Every Application | |

FIG. 21

| Application No | Type of Application |
|---|---|
| 01 h | VCR Control (Basic) |
| 02 h | VCR Control (Special) |
| 03 h | Tuner Control |
| 04 h | Camera Control |
| 05 h | Printer Control |
| 06 h | Accessory Control |

FIG. 22

| Application OPC | Rule of LANC System Command Allocation |
|---|---|
| 1× h | Special Target Key Code Inquiry, etc |
| 4× h | Inquiry |
| 5× h | Control |
| 6× h | Concerning Entire Application (Open/Close, etc) |

FIG. 23

| | | | Correspondence to LANC |
|---|---|---|---|
| Application No | 01 h | VCR Control (Basic) | |
| Application OPC | 50 h | Control | |
| Application OPR1 | XX h | Command Control | WORD 1 |

FIG. 24

| Application OPR1 | Command |
|---|---|
| 2C h | EJECT |
| 30 h | STOP |
| 32 h | PAUSE |
| 34 h | PB |
| 36 h | REWIND |
| 38 h | FF |
| 3A h | REC |

FIG. 25

| | | | Correspondence to LANC |
|---|---|---|---|
| Application No | 01 h | VCR Control (Basic) | |
| Application OPC | 40 h | VCR Mode Inquiry | |
| Application OPR1 | XX h | VCR Mode Code | WORD 4 |
| Application No | 01 h | VCR Control (Basic) | |
| Application OPC | 41 h | VCR Status Inquiry | |
| Application OPR1 | XX h | VCR Category | WORD 5 |
| Application OPR2 | XX h | VCR Status | WORD 6 |
| Application OPR3 | XX h | VCR Status | WORD 7 |
| Application No | 01 h | VCR Control (Basic) | |
| Application OPC | 42 h | Counter Inquiry | |
| Application OPR1 | XX h | Counter Type | WORD 5 |
| Application OPR2 | XX h | Counter | WORD 6 |
| Application OPR3 | XX h | Counter | WORD 7 |
| Application OPR4 | XX h | Counter | WORD 6 |
| Application OPR5 | XX h | Counter | WORD 7 |

FIG. 26

| Application OPR1 | VCR Mode |
|---|---|
| 01 h | EJECTED |
| 02 h | STOP NORMAL |
| 03 h | FF |
| 83 h | REWIND |
| 04 h | NORMAL REC |
| 14 h | REC PAUSE |
| 16 h | NORMAL PB |
| 46 h | CUE |
| 56 h | REVIEW |
| 07 h | PB PAUSE |

FIG. 27

| 01 h (VCR Control [Basic]) | 40 h (VCR Mode Inquiry) | FF h (Dummy) |
|---|---|---|

(a) Status Inquiry Command

| 01 h (VCR Control [Basic]) | 40 h (VCR Mode Inquiry) | 46 h (CUE Mode) |
|---|---|---|

(b) Response

FIG. 28

| | | | Correspondence to LANC |
|---|---|---|---|
| Application No | 02 h | VCR Control (Special) | |
| Application OPC | 50 h | Control | |
| Application OPR1 | XX h | Command Code | WORD 1 |

FIG. 29

|  |  |  | Correspondence to LANC |
|---|---|---|---|
| Application No | 03 h | Tuner Control | |
| Application OPC | 50 h | Control | |
| Application OPR1 | XX h | Command Code | WORD 1 |

FIG. 30

|  |  |  | Correspondence to LANC |
|---|---|---|---|
| Application No | 03 h | Tuner Control | |
| Application OPC | 40 h | Channel Inquiry | |
| Application OPR1 | XX h | Channel Type, 100 Digit | WORD 3 |
| Application OPR2 | XX h | Channel 10 Digit, One Digit | WORD 3 |
| Application No | 03 h | Tuner Control | |
| Application OPC | 41 h | Status Inquiry | |
| Application OPR1 | XX h | Status Information | WORD 3 |

FIG. 31

|  |  |  | Correspondence to LANC |
|---|---|---|---|
| Application No | 04 h | Camera Control | |
| Application OPC | 50 h | Control | |
| Application OPR1 | XX h | Command Code | WORD 1 |

| Application OPR1 | Command |
|---|---|
| 35 h | Zoom Tele |
| 37 h | Zoom Wide |
| 41 h | Focus Auto Manual |

| | | | Correspondence to LANC |
|---|---|---|---|
| Application No | 04 h | Camera Control | |
| Application OPC | 41 h | Status Inquiry | |
| Application OPR1 | XX h | Status Information | WORD 3 |

ELECTRONIC EQUIPMENT, METHOD OF CONTROLLING OPERATION THEREOF AND CONTROLLING METHOD

CROSS-REFERENCE TO RELATED APPLICATIONS

This application is a continuation of application Ser. No. 09/296,090, filed Apr. 21, 1999, now U.S. Pat. No. 6,247,132, which is a continuation of application Ser. No. 08/690,368, filed Jul. 26, 1996, now abandoned.

BACKGROUND OF THE INVENTION

1. Field of the Invention

The present invention concerns a system in which a plurality of electronic equipments are connected by way of a bus and communication is conducted between each of the electronic equipments and, more specifically it relates to a system in which an originally developed application is made usable also by other company under a license contract.

The present invention concerns a system in which a plurality of electronic equipments are connected by way of a bus capable of transmitting information signals and control signals, and communication is conducted between each of the electronic equipments and, more specifically, it relates a technique for carrying command/status for controlling an analog equipment on a control signal of a predetermined format.

2. Description of Related Art

As a system in which a plurality of electronic equipments are connected by ways of a bus and communication is conducted between each of the electronic equipments, a communication system using an IEEE-1394 serial bus is considered. In the communication using the IEEE-1394 serial bus electronic equipments such as digital video tape recorders, digital video cameras, digital television receivers and personal computers (hereinafter referred to simply as equipments) are connected by way of the IEEE-1394 serial bus and communication is conducted between each of the equipments for information signals such as digital audio/video signals and control signals such as connection control commands.

In the communication system using the IEEE-1394 serial bus, a vendor unique command is provided in order that each of manufacturers attains an application of its own (basic command to provide compatibility between each of companies is defined separately from the vendor unique command). It is specified that a company ID is attached to a packet of a vendor unique command for indicative the manufacturer. Accordingly, the application attained by using the vendor unique command is basically valid only for the manufacturer.

Even an originally developed application is sometimes valid for other companies. When an application has no such general applicability that it is registered as a common command, the originally developed application by a certain manufacturer is sometimes intended to be used also by other manufacturer. When other manufacturer uses a vendor unique command for the application, a company ID of the manufacturer developing the application has to be used.

Then, if the manufacturer developing the application admits other manufacturer to use the company ID under a formal license contract, other company also enables to use vendor unique commands other than the application.

The present invention has been accomplished in view of the foregoing problem and provides an equipment that enables the use of other company on every originally developed application, as well as a controlling method therefor.

As a system in which a plurality of electronic equipments are connected by way of a bus and communication is conducted between each of the electronic equipments, a communication system using an IEEE-1394 serial bus is considered. In the communication system using the IEEE-1394 serial bus, electronic equipments such as digital video cassette records (hereinafter "video cassette recorder" is simply referred to as "VCR"), digital video cameras, digital television receivers and personal computers (hereinafter referred to simply as equipments) are connected by way of the IEEE-1394 serial bus and communication is conducted between each of the equipments for information signals such as digital audio/video signals and control signals such as connection control commands.

In the communication system using the IEEE-1394 serial bus, AV/C-CTS (Audio Video/Control Command Transaction Set) which is a command transaction set for controlling an audio/visual equipment can be used in an equipment control protocol of a digital interface. Then, the operation of a digital VCR or the like can be controlled from other equipment in the communication system by using this. AV/C-CTS is a "mode drive type" command set designating a final status to a digital VCR, for example, such that "go to playback pause (PB PAUSE) status".

On the other hand, as a system for controlling the operation of an analog VCR from the outside, LANC (Local Application Control Bus System: registered trade mark) has been popularized at present. In LANC, if it is intended to put an analog VCR, for example, to PB PAUSE status, a "PAUSE" command is sent after confirming that it is in the playback status. LANC is a so-called "command drive type" command set.

Digital VCR under development at present for commercialization are designed so as to cope with both AV/C-CTS and LANC.

However, even in the control by way of a digital interface, all operation controls can not be covered by the mode drive type command. For example, in a case of channel selection by a tuner, a command indicative of a channel number or a station name is sent in the mode drive type, but broadcastings per se are different and channels preset to equipments are also different depending on areas. Further, an infrared remote commander as a point of contact with user's operation (hereinafter "remote commander" is simply referred to as "remocon") is command driven and requires a command drive type command for instruction of channel up/down such as "Channel +"/"Channel −".

Then, as a command set for the digital interface, it may be considered to dispose a command drive type command set separately from AV/C-CTS but, in this case, since a digital VCR as an equipment to be controlled correspond to three kinds of command sets, load on a microcomputer for processing the commands (hereinafter "microcomputer" is simply referred to as "micon") is increased.

The present invention has been accomplished in view of the foregoing problem and it is an object thereof to introduce a command drive type command set without increasing the burden on a micon for processing the commands.

SUMMARY OF THE INVENTION

In order to solve the subject, an equipment and a method of controlling the operation thereof according to the present invention, provides a method of controlling the operation of an application attained by using a control signal of a predetermined format containing manufacturer's information of the electronic equipment in a system in which a plurality of electronic equipments are connected by way of a bus and communication for information signals and control signals are conducted between each of the electronic equipments, wherein a controlling electronic equipment transmits a control signal of the predetermined format containing predetermined cipher information to an electronic equipment to be controlled, and the electronic equipment to be controlled renders the application executable if the received control signal contains the predetermined cipher information.

In accordance with the present invention, a controlling equipment transmits a control signal of a predetermined format containing previously determined cipher information to an equipment to be controlled, and the equipment to be controlled renders the application executable when the received control signal contains the previously determined cipher information.

For solving the foregoing subject, the equipment according to the present invention has a feature in which a plurality of electronic equipments are connected by way of a bus and communication for information signals and controls signals is conducted between each of the electronic equipments, wherein a first controlling means for administrating the mode of an electronic equipment and a second controlling means for processing command/response transmitted/received by way of the bus are provided, and a command drive type command for controlling an analog equipment prepared by the first controlling means is carried on a control signal of a predetermined format by the second controlling means.

Further, a method of controlling an equipment according to the present invention has a feature in a system in which a plurality of electronic equipments are connected by way of a bus and communication for information signals and control signals is conducted between each of the electronic equipments, wherein a command drive type command for controlling an analog equipment is carried on a control signal of a predetermined format.

In the present invention, it is preferred that the control signal of a predetermined format contains a manufacturer's information for equipment and is adapted to carry a mode drive type command set.

BRIEF DESCRIPTION OF THE DRAWINGS

FIG. 5 is a view illustrating the outline of command/response between controller/target.

FIG. 6 is a chart illustrating the constitution of a vendor unique command.

FIG. 7 is a chart illustrating inquiry command/response for target key code.

FIG. 8 is a chart illustrating opening control command/response for application K.

FIG. 9 is a chart illustrating an example of inquiry command/response for opening/closure when a correct value is designated as an application key code.

FIG. 10 is a chart illustrating an example of a closing command.

FIG. 16 is a view illustrating the constitution of WORD of LANC.

FIG. 17 is a flow illustrating the processing in DIFcon and MODEcon.

FIG. 18 is a view illustrating a portion of a mode transition table.

FIG. 19 is a view illustrating a constitution for a vendor unique frame in AV/C-CTS.

FIG. 20 is a view illustrating a constitution of a vendor unique command.

FIG. 21 is a view illustrating examples of allocating application No. of LANC.

FIG. 22 is a view showing a rule for command allocation in a LANC system.

FIG. 23 is a view illustrating the correspondence to Command to VCR (basic function), FIG. 24 is a view illustrating example of command codes in FIG. 23.

FIG. 25 is a view illustrating VCR information obtained by status inquiry.

FIG. 26 is a view illustrating examples of VCR mode code.

FIG. 27 is a view illustrating an example of inquiry command and response.

FIG. 28 is a view illustrating correspondence to Command to VCR (special function).

FIG. 29 is a view illustrating correspondence to tuner control.

FIG. 30 is a view illustrating examples of tuner information obtained by status inquiry.

FIG. 31 is a view illustrating correspondence to camera control.

DETAILED DESCRIPTION OF THE PREFERRED EMBODIMENTS

The preferred embodiments of the present invention are to be explained in the following sequence:

[1] Vendor unique command
[2] Use of the vendor unique command by other company
[3] Explanation for the content of the system
   (3-1) Opening of application
   (3-2) Condition for encipherment
   (3-3) Information required for opening the application (3-4) Method of opening the application
(3-5) Command during opening
(3-6) Closure of the application
(3-7) Condition for execution and closure of the application
[4] Protection of application
(4-1) Administration by company ID
(4-2) Setting target key code
(4-3) Cipher function fk
[5] Constitution and operation of target.
[1] Vendor Unique Command In a function control protocol for a digital interface to an IEEE-1394 serial bus (hereinafter simply referred to as FCP), a plurality of command transaction sets can be used.

Figure 1:
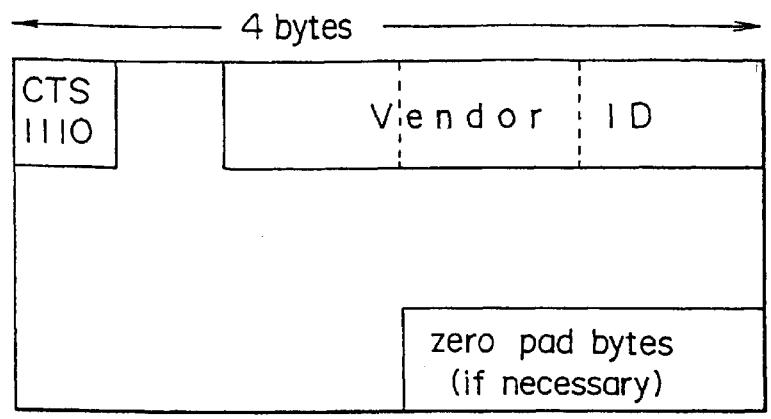
FIG. 1 is a view for showing a format of a vendor unique frame.

FIG. 1 shows a format for a vendor unique frame. CTS (Command Transaction Set)=1110 shows that this is the vendor unique frame. Then, a 3-byte vendor ID (company ID specified by IEEE) is used after 4 bits to CTS. A vendor can optionally define and use those other than CTS and indicative of the vendor unique the vendor ID. That is, the command set and transactions such as transmission and reception of command response used therein depend on the vendor. Zero pad bytes are disposed, if necessary, for making the frame length to 4 byte (quadrant) units.

Figure 2:
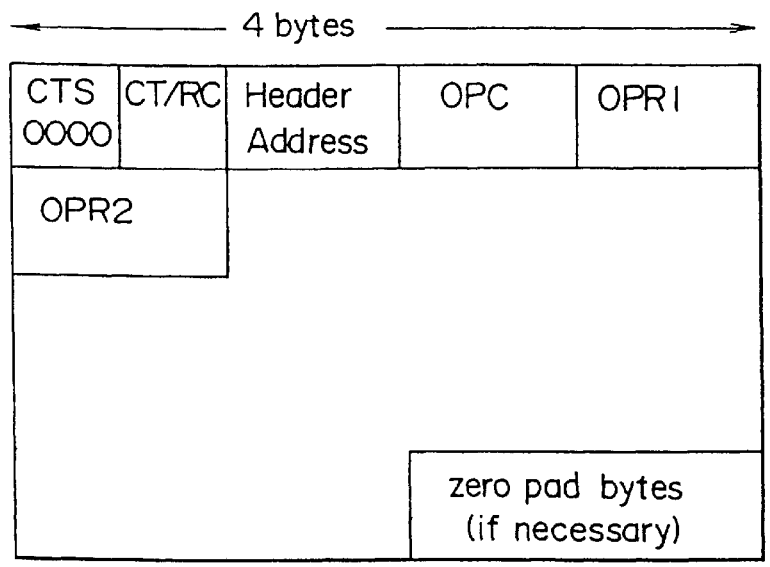
FIG. 2 is a chart illustrating a frame constitution of AV/C command transaction set.

FIG. 2 shows a frame constitution of AV/C (Audio Visual/Control) command transaction set, which is a command transaction set for AV equipment control. CTS=0000 shows that this is an AV/C command transaction set.

Figures 3, 4:
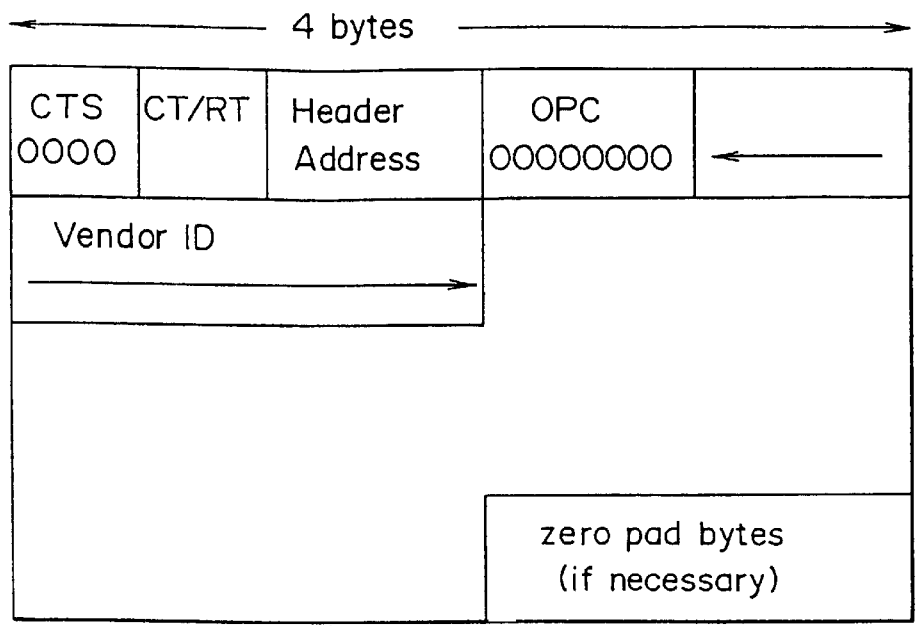
FIG. 3 is a chart illustrating a constitution of a vendor unique frame defined by AV/C command transaction.
FIG. 4 is a chart illustrating an example of application No.

Also in an AV/C command transaction set, a vendor unique is defined as operation code (OPC) so that the vendor can freely define the command. However, the transaction of command/response is in accordance with an AV/C command transaction. FIG. 3 shows a frame constitution in this case. OPC=00h indicates that this is a vendor unique. A 3-byte company ID is used for the vendor ID in the same manner as described previously.

[2] Use of the Vendor Unique Command by Other Company

In FCP, a node controlling other node is referred as a controller, and a node to be controlled is referred as a target. Explanation is to be made by using the terms of the controller and the target.

The vendor unique command is defined and used by a company possessing the company ID described in the vendor ID but other company may some times intend to use the same command depending on the application.

Explanation is to be made for an example of a company A with company ID=xxxxxxh and a company B with company ID=yyyyyyh. The company A defines a unique command for an application K as a vendor unique command and uses the same for products of the company A. The company B intends to correspond the application K using the vendor unique command of the company A also in the products of the company B. There are to corresponding methods by the company B. That is, a case in which the company B manufactures a controller and controls products of the company A as a target, and a case in which the company B manufactures products as a target which is to be controlled by the controller of the company A. In any of the cases, the application K can not be attained unless the vendor unique command of the company A is used.

The system to be explained below is for enabling the use, in limited companies, of several applications that a company as a possessor of vendor unique commands has attained by using the vendor unique commands.

Introduction of the system enables to generally inhibit the use of the vendor unique command by other companies but provide a right of use on every application. Accordingly, the company B, in the previous case, is enabled to use the vendor unique command regarding the application K of the company A.

[3] Explanation for the Content of System
(3-1) Opening of an application

The target has an "open state" and a "closed state" on every application attained by the vendor unique command. The open state means such a state of accepting a command and capable of executing the application. The closed state means a state of not executing even if a command is accepted.

As described above, since the vendor unique command is not a command disclosed publicly, all of applications are usually put to the closed state so that a command is not executed if a third party (for example, company C) transmits the command while attaching the company ID=xxxxxxh of the company A with no authorization. Then, it is adapted that the application K is executed after the application K is put to the open state for the company A defining the vendor unique command, as well as company B obtaining the right of use. Teaching the means for putting the open state is equal with provision of the right of use for the application.

(3-2) Condition for encipherment

The controller sends an open command to the target while designating an application to be opened. In this case, an agreement is set between the controller and the target, such that the an open command is effective only when is transmitted with a predetermined code. It is necessary that the code is not recognized by third parties. The code is previously determined between the company A and company B. In this case, it is adapted such that the value is made different on every equipments or depending on the time even for one identical equipment.

The code may be considered as a sort of cipher and, since it is intended to be used in a consumer's equipment, it is necessary that the code can be treated simply also by an one chip microcomputer to mitigate burden as less as possible both for the controller and the target. For the consumer's equipment, if a commercial good is once marketed, it is difficult to change the cipher system subsequently.

(3-3) Information required for opening the application

Explanation is to be made to information required for opening each application.

(1) Application No.

A code indicative of the kind of the application is referred to as an application No. FIG. 4 shows examples of application Nos. In this case, the kind of the application is indicated by 1 byte. When the application No. is allocatable from 01h to FEh, applications of up to 254 types can be coped with. 00h is inhibited from use (reserved) since this is used in common with each of applications. Further, FFh is reserved for extension in case if the number of applications is increased.

(2) Cipher function f

"Key" sent together with an application No. upon opening an application is referred as an application key code. A method of forming the application key code (encipherment) is different on every application, which is previously determined between the company A and the company B. This is defined as a cipher function f, and the cipher function of the application K is defined as fk.

(3) Target key code

A target key code is a value determined on every target, which is a base for forming an application key code to all applications. The application key code is changed even for one application by a means such as attaching a target key code which is different on every equipment.

Upon opening the application, the controller sends a target key code inquiry command to the target and recognizes the current target key code by obtaining a response.

(4) Application key code

The target key code enciphered by a cipher function f is an application key code. That is, the application key code corresponding to the application K can be represented as:

Application key code=fk(target key code)

(3-4) Method of opening the application

Description is to be made to a method that the controller puts the application K of the target into the open state.

(1) Command sending procedure

FIG. 5 shows a schematic view for command/response between controller/target.

At first the controller sends a target key code inquiry command to a target (procedure (1). The target returns, as a response thereto, a target key code of its own at that instance (procedure (2)).

Upon accepting the target key code, the controller multiplies the cipher function fk with the target key code to calculate an application key code.

Then, the controller sends to the target an application opening command while attaching the application No. and the calculated application key code (procedure (3)).

Upon accepting the opening command, the target confirms whether the application of the designated application No. is provided or not. Then, if the application is corresponded, it multiplies the application key code to the inverse function of the cipher function fk for decoding.

The target confirms whether or not the result of the decoding is equal with the target key code of its own. Then, if it is equal, it at first regards the application K opening command valid and enters into an application executable open state.

The target, upon putting the application K to the open state, returns a response to the controller for informing that the application K has been put to the open state (procedure (4)).

(2) Command format

As has been explained with reference to FIG. 1 and FIG. 3, while the vendor unique command can be attained by using any of the vendor unique frame or AV/C command transaction set, an example of using the AV/C command transaction set as a command constitution is shown.

FIG. 6 shows the constitution of the vendor unique command. Only the region succeeding to the 3 byte vendor ID that the vendor defines individually (after OPR 4) is shown. As described previously, the transaction of command/response is in accordance with the AV/C command transaction set. No concrete command for executing the application is described here. This is to be defined on every application.

FIG. 7 shows command/response for target key code inquiry. In this case, the application No. is defined as kkh and the target key code is defined as 16 bit 1234h. The length of the target key code can be determined on every application.

Since it may be considered that the target key code takes a different value on every equipment/every application or takes a random number, inquiry is always made upon initiating execution for each application. FIG. 7(a) shows inquiry commands. In this case, OPR 4 is application No., and 10h in OP 5 and 71h in OP 7 show the target key code inquiry. Further, OP7 and OP 8 are defined as FFh (dummy).

The target, if corresponding to the application attached to the inquiry command (application K), answers to the controller a response "stable" attaching the 16 bit target key code 1234h to OP 7 and OP 8. If not corresponding to the application, the target returns response of "Not Implemented" with the same content as the inquiry command as shown in FIG. 7(c).

Then, open control command of the application K that the controller sends to the target and the response thereof are shown in FIG. 8(a), (b). In this case, the application key code is defined as 16 bit 5678h. The length of the application key code can be determined on every application.

If the designated value of the application key code attached to the command is different from the value of the application key code possessed by the target and opening is impossible, response of "Rejected" is basically returned to the controller. However, it may be considered that a third party tries one by one from 0000h to FFFFh in the course of searching the application key code. Then, even when it can not be opened, a response of "Accepted" is returned intentionally. FIGS. 8(c), (d) show an example in capable of opening (5679h is designated instead of correct application key code=5678h). Since the third party can not recognize whether the opening has been succeeded or not merely by the transaction of the opening command, it requires a procedure of sending an application executing command or an inquiry if it is during opening.

Inquiry as to whether the application is in the open state or the closed state is also sent by attaching the application key code. "Accepted" is returned when the designated value for the application key code is exact, and "rejected" is returned if it is not correct as a response. FIGS. 9(a), (b) show examples of command and response in a case where exact value (5678h) is designated as the application key code.

(3-5) Command during opening

Only while the application is opened (executable state), the target accepts the command for the application. The command format is determined on every application excepting that the first 1 byte shows the application No. as shown in FIG. 6.

In a case if an execution command for the not corresponded application is received irrespective that whether the application is in the open state or in the closed state, "Not Implemented" is returned as a response. Further, even if the application is in the open state, if it does not correspond to that designated as OPC determined on every application, "Not Implemented" is returned as the response.

(3-6) Closure for application

Basically, the equipment as the target automatically puts all the applications into the closed state upon turning off a power source. The closed state is continued even when the power source is turned on again.

Upon completing the execution of application, the controller sends a closing command to the target. FIG. 10 shows examples of closing commands. Thus, the command is sent by attaching the application key code also in the case of closure. The target, when accepting the close command, puts the application indicated by the application No. of the closing command into the closed state. In this case, it is put to the closed state even when the value of the application key code is different. It is basic in this system that the application is usually put to the closed state and then opened only upon execution.

By the way, if a command which is acceptable in the open state is received in the closed state, "Rejected" is returned as the response.

(3-7) Condition for execution and closure of the application

Various cases may be considered depending on the applications such as an application causing problems when left open as it is for a long period of time or an application intended to be controlled exclusively once after it is opened. Accordingly, executing condition or the like suitable to the use is determined on every application. An example is shown below.

(1) Restriction on the open time

In a case when a command for executing the application is not accessed for more than a predetermined time although kept in the open state, it is compulsorily closed. The instance for the time out determined on every application.

(2) Procedure for bus abnormality

When resetting is applied to the bus, it is compulsorily closed.

(3) Number of equipments allowed for execution of an application

It is adapted not to permit control from a plurality of controllers. The target memorizes the controller that opened the application thereof and accepts only the command from the controller for the application executing command. In this case, a command from other controllers is rejected even during opening.

(4) Protection of an application

Even if enciphered application key code is sent, the application can not be protected completely. Since even a third party not having a right of using the application can intercept the content of communication between the controller and the target, it may be considered that the cipher function fk can be determined based on the intercepted target key code and the application key code by using a computer.

(4-1) Administration by company ID

Then, means for protecting the application against such a situation is considered. If a third party not having a right of use manufactures an equipment as the target, it is possible to detect a third party and inhibit so as not to execute the application by the following method if the load on the controller is or negligible.

Figures 11, 12, 13:
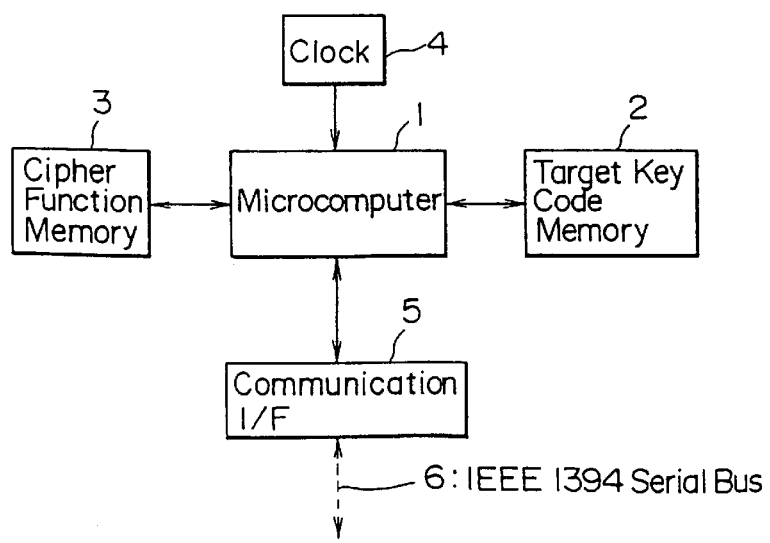
FIG. 11 is a chart illustrating an example of a registration list for company ID of a company having a right of use.
FIG. 12 is a chart illustrating an example of a corresponding table between target key code and an application key code.
FIG. 13 is a view illustrating an example of constitution of a target.

Explanation is to be made to such an example that a personal computer executes the application as the controller. A company ID as an object for the execution of application (a company having a right of use) is registered on the personal computer. Then, a vendor ID inquiry command is sent to the target and check if the vendor ID attached to the response is registered or not. Since a node unique ID is written in the inside in the equipment corresponding to the IEEE-1394 serial bus, this inquiry is conducted, for example, before procedure (1) in FIG. 5. In this case even if a company C as a third party (company ID=zzzzzzh) manufactures with no authorization such a target as capable of accepting a vendor unique command based on a vendor ID=xxxxxxh of the company A and executing the application K, since the controller can recognize that the company C is not registered based on the list of the registered ID as shown in FIG. 11, the controller can inhibit the actuation of the application K.

In this case, since it may be considered that the number of companies obtaining the right of using the application K is actually increased, the method of protection as in the above-mentioned example is applicable to a case the list can be updated.

(4-2) Setting target key code

For a relationship of application key code=fk (target key code), decoding of the cipher function fk is facilitated more as the number of the samples of the target key code and the application key code is increased. Considering application to consumers' equipments, it is desirable that the target key code changes not frequently but occasionally in a certain kind of equipment. Then, the target key code is set, for example, as below.

(1) Change by the number of products

The target key code is changed, for example, on every hundred thousand number of products. When a third party manufactures a controller, although it can correspond to the target key code for the initial one hundred thousand of products, products manufactured subsequently are not operated by the controller manufactured by the third party.

(2) Change by built-in clock (calender)

The target key code is changed, for example, on every one year even for an identical equipment. Equipments produced in the year of 1995 have a target key code of a value based on 1995. Then the third party manufactures a controller based on the target key code at the initial stage. Accordingly, although the operation is possible at the initial stage also by the controller of the third party, it is not operated as the year rolls.

(4-3) Cipher function fk

If the cipher function fk is a numerical value calculation formula, fk can be determined simply depending on the number of samples of the target key code and the application key code. Then, when it is introduced into a consumer's equipment, fk is not formed as a numerical value function, but an application key code is allocated in 1-to-1 relationship to the target key code, and the reference table is handed as fk to a company having the right of using the application K. FIG. 12 shows an example of the reference table. With this procedure, it is difficult to determine the cipher function fk. Further, it can be coped with simply even by one chip microcomputer. Further, even once after commercial goods are marketed, the cipher system can be changed relatively simply by version up of ROM.

[5] Target constitution

FIG. 13 shows an example of a target constitution applied with the present invention. As shown in the figure, the node as the target comprises a microcomputer 1, a target key code memory 2, a cipher function memory 3, a clock 4 and a communication interface 5.

The microcomputer 1 controls all the processings regarding the application such as opening/closure of the incorporated preparation of command/response and preparation of application key code.

The target key code memory 2 possesses a target key code different on every application. Further, a plurality of target key codes are stored therein on every application, so that the target key code can be changed on every one year.

The cipher function memory 3 possesses a cipher function fk on every application. In this case, this is a ROM table storing the reference table between the target key code and the application key code as shown in FIG. 12.

The clock 4 informs the microcomputer 1 with the current clock information. The microcomputer 1, referring to the clock information, switches and reads out the target key code upon elapse of every year.

The communication interface 5 is an interface for sending/receiving command/response to/from IEEE-1394 serial bus 6.

Although a block for processing audio/video signals is provided to an actual target, only the block having concerns with the opening of the application is shown.

The constitution of the controller is to be explained briefly. A controller corresponding to the target in FIG. 13 comprises a microcomputer, a cipher function memory and a communication interface. If the controller conducts administration by the company ID as explained in (4-1), it has further a memory for registering the company ID of a company as an object for the execution of the application.

Then, explanation is to be made to an operation till the target shown in FIG. 13 opens the application. At first, the controller accepts inquiry command for the target key code sent by the controller (refer to procedure (1) in FIG. 5 and FIG. 7(a)). The microcomputer 1, referring to the target key code memory 2, reads out a target key code corresponding to the application No. attached to the inquiry command and sends a response "Stable" by way of the communication interface 5 (refer to procedure (2) in FIG. 5 and FIG. 7(b)). If there a target key code corresponding to the application No. attached to the inquiry command is not present, response "Not Implemented" is sent (refer to FIG. 7(c)).

When receiving the response "Stable" from the target, the controller detects the target key code attached there and reads out the incorporated cipher function memory to prepare an application key code. The cipher function memory is constituted in the same manner as the cipher function memory 3 of the target. The controller sends, to the target, an opening command with the prepared application key code (procedure (3) in FIG. 5, FIG. 8(a)).

The microcomputer 1 in the target compares the application key code attached to the accepted opening command with the application key code corresponding to the target key code stored in the cipher function memory 3 of its own. That is, in this case, the target key code is not decoded from the application key code by using an inverse function for the cipher function as shown in FIG. 5, but encipherment is conducted in the same manner as the controller. It may of course be constituted such that the target key code is decoded from the application key code. If the application key codes compared are identical with each other, the target puts the application to the open state and returns a response of "Accepted" to the controller for informing that the application is put into the open state (refer to procedure (4) in FIG. 5).

The mode of practicing the present invention is to be explained specifically in the order of:

[1] Control system for a digital VCR to which the present invention is applied,
[2] Digital interface and LANC,
[3] How to carry LANC command on a digital interface,
[4] Code allocation
   (4-1) Rule for allocating application OPC
   (4-2) VCR control (basic) code
   (4-3) VCR control (special) code
   (4-4) Tuner control code
   (4-5) Camera control code
[5] Command -on/-off

[1] Control System for a Digital VCR to which the Present Invention is Applied

Figure 14:
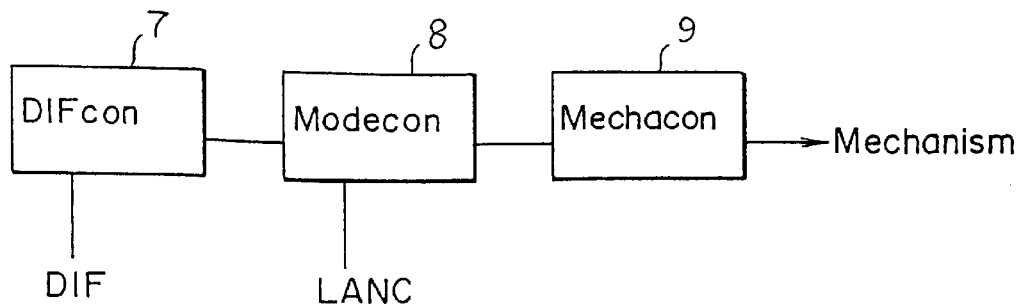
FIG. 14 is a block diagram illustrating a constitution for a control system of a digital VCR.

FIG. 14 is a block diagram illustrating a constitution of a control system for a digital VCR to which the present invention is applied. As shown in the figure, the digital VCR to which the present invention is applied comprises a digital interface micon (hereinafter simply referred to as DIFcon) 7, a mode control micon (hereinafter referred to simply as MODEcon) 8 and a mechanism control micon (hereinafter simply referred to as MECHAcon) 9.

DIFcon 7 conducts transmission/reception of AV/C-CTS between it and other equipments connected by way of the IEEE-1294 serial bus (not illustrated). Further, it conducts both way conversion between AV/C-CTS and LANC signals (to be detailed hereinafter).

The MODEcon 8 conducts transmission/reception of LANC signals between it and other equipments connected by a LANC cable (Not illustrated). Further, it transmits and receives LANC signals to and from DIFcon.

Mechacon 7 controls the mechanism in accordance with the command sent from the MODEcon 8. Further, it informs the MODEcon 8 with the status of the mechanism.

[2] Digital Interface and LANC

Figure 15:
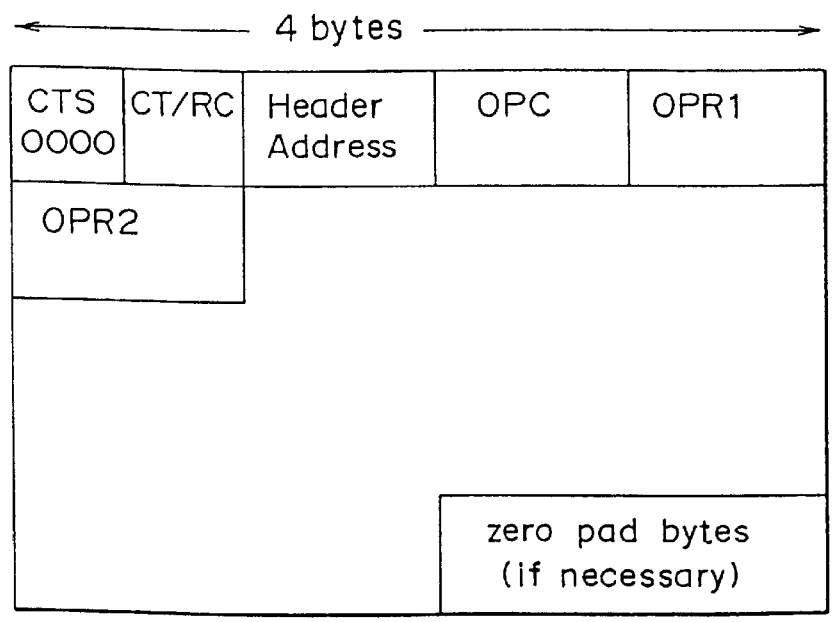
FIG. 15 is a view illustrating the constitution for a frame of AV/C-CTS.

FIG. 15 shows a frame constitution of AV/C-CTS. In this case, CTS=0000 indicates that this is AV/C-CTS. A zero pad bytes are disposed as necessary for defining the frame length to a 4 bytes (quadrant) unit.

On the other hand, LANC is such a system in which VCR conducts both way communication as a master of the communication, synchronized with vertical sync signals of video signals with respect to peripheral equipments. Then, it transmits/receives 8 word data having the word constitution as shown in FIG. 16 on every field.

FIG. 17 shows a flow for code processing of DIFcon 7 and MODEcon 8 in FIG. 14. The MODEcon administrates the operation status of the VCR by the VCR mode code of WORD 4 of the LANC code, and transfers the information upon communication with the DIFcon.

Upon receiving a status inquiry command for the mechanism mode sent from the digital interface, DIFcon converts the VCR mode sent from the MODEcon into a code of AV/C-CTS and sends the response of the status by way of a digital interface.

Further, the mechanism control command sent at the digital interface (mode drive type) is converted by the DIFcon to the VCR mode code of LANC and then sent as a final mode to the MODEcon (this is also mode driven).

For the command sent from LANC (command drive type), the MODEcon receives the same, indexes a mode to transit with reference to a mode transition table based on the current mode and the received command and administrates as the final mode.

FIG. 18 shows a portion of the mode transition table. The mode transition table shows VCR modes on the left in a vertical column, and shows commands in the upper lateral row. When a certain mode is transited by a certain command, the designated transition mode is described at an area of intersection of the table. If the area as the intersection is blank, this means that the command is not accepted or the mode is not transited even if the command is accepted. -on/-off attached to the name of the command indicates an edge for initiation and termination of the command transmission. In LANC, coincidence is checked twice or more for accepting the command, in consideration of a communication error, and the edge corresponds to the timing of coincidence for twice or more.

The final mode generated by the MODEcon with reference to such a mode transition table is transmitted to the MECHAcon by way of internal communication, and the mechanism is controlled so as to attain a desired mode.

[3] How to Carry LANC a Command on a Digital Interface

In AV/C-CTS, a vendor unique frame is defined as OPC (Operation Code)-such that a manufacturer of an equipment can optionally define a command. However, command/response transaction is in accordance with AV/C-CTS.

FIG. 19 shows a constitution of a vendor unique frame defined in AV/C-CTS. OPC=00h indicates that this is vendor unique. The vendor ID uses 3 byte company ID. The company ID is determined by IEEE.

In this embodiment, it is adapted that a LANC command can be transmitted by using a vendor unique command in accordance with AV/C-CTS. FIG. 20 shows the constitution of the vendor unique command. In this figure, commands other than the application No indicating the type of the application are defined on every application.

Then, as shown in FIG. 21, from 01h to the 06h are used for LANC as the application No. Further, for making the application executable from other equipment, it is desirable to define cipher information on every application and make the application executable only when the cipher information is received.

[4] Code allocation (4-1) Rule for allocating application OPC

As shown in FIG. 21, six applications are provided for LANC, and code is allocated for OPC (operation code), OPR (operand) defined on every application in accordance with an identical rule. In LANC, since the command code and the status code are different, an inquiry system (4xh) and a control system (5xh) are separated as OPC as shown in FIG. 22. In FIG. 22, the target key code is a code of an equipment to be controlled as a base for forming cipher information for making the application executable (open status).

The control system corresponds to WORD 0, 1 in a command transmission area of LANC and a designation corresponding to WORD 0 is indicated by the application No. and the application OPC. Then, the command code for WORD 1 of LANC is allocated as it is to the application OPR 1. Accordingly, the operand of the command in the control system consists of 1 byte. The control system command is sent in accordance with the control command of AV/C-CTS.

Information such as VCR mode is outputted at a predetermined period in LANC. However, when the LANC command is carried on the digital interface, inquiry is made only when the information is required and response is made thereto, in order to avoid occupation of the bus and in accordance with the transaction rule of AV/C-CTS. The inquiry system command is sent together with a dummy code in accordance with the status inquiry command of AV/C-CTS and data is filled at a dummy code as a response thereto.

(4-2) VCR control (basic) code

The control system corresponds to "Command to VTR (basic function)" of WORD 0, 1 of LANC. As shown in FIG. 23, 01h of the application No. and 50h of the application OPC indicate that- this is the basic control command designated to VCR. Then, for the application OPR 1, a command code of "Command VTR (basic function)" for WORD 1 of LANC is allocated as it is. FIG. 24 illustrates a portion of allocation for the command codes.

The inquiry system corresponds to VCR mode, VCR status and numerical data, for example of a counter of WORD 4, 5, 6, 7 of LANC. Code allocation of LANC is allocated as it is in areas corresponding to LANC in which WORD names are listed in FIG. 25. Further, FIG. 26 shows examples of codes for VCR mode and FIG. 27 shows an example of an inquiry command and a response.

(4-3) VCR control (special) code The control system corresponds to "Command to VTR (special function)" for word 0, 1 of LANC. As shown in FIG. 28, application No.02h and application OPC 50h indicate that this is a special control command designated to VCR. Then, for the application OPR 1, a command of "Command to VTR (special function)" for WORD 1 of LANC (not illustrated) is allocated as it is. Commands related to edition or the like are present.

For the inquiry system, a status corresponding to the command of "Command to VTR (special function)" is outputted. Code allocation is corresponded with the command of LANC.

(4-4) Tuner control code

The control system corresponds to "Command to Tuner" for WORD 0, 1 of LANC. As shown in FIG. 29, 03h of application No. and 50h of application OPC indicate that this is a control command designated to the tuner.

The inquiry system corresponds to "Tuner Status" for WORD 2, 3 of LANC. As shown in FIG. 30, 03h of application No. and 40h of application OPC indicate that this is a channel inquiry command designated to the tuner, and 03h of application No. and 41h of application OPC indicate that this is a status inquiry command designated to the tuner.

(4-5) Camera control code

Figures 32, 33, 34:
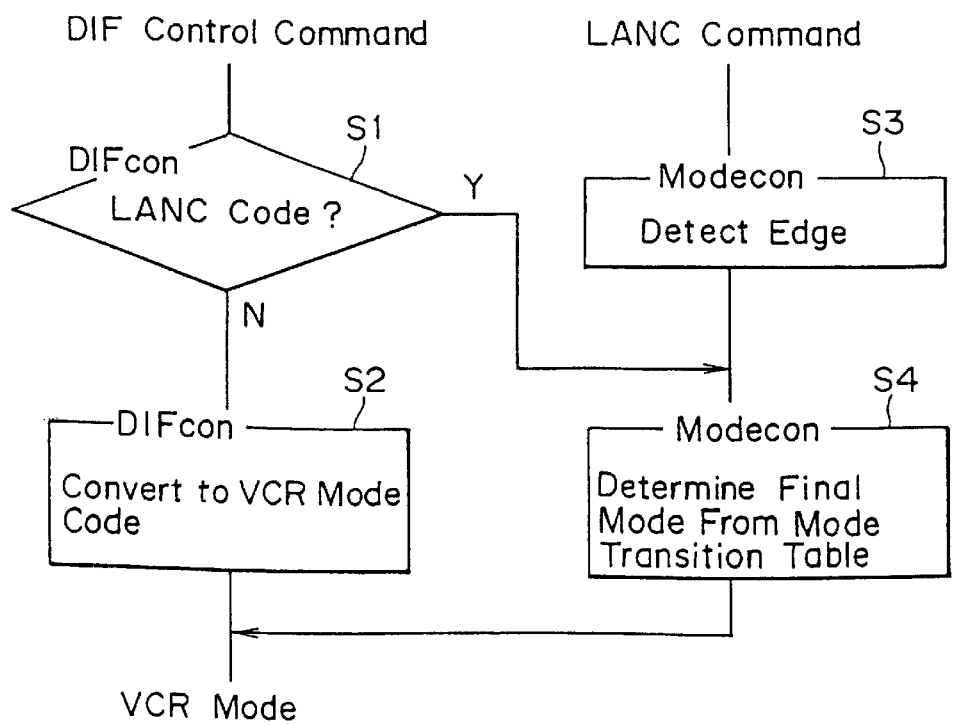
FIG. 32 is a view illustrating examples of command codes in FIG. 31.
FIG. 33 is a view illustrating examples of camera information obtained by status inquiry.
FIG. 34 is a flow chart for processing a command in a case of causing mode transition.

The control system corresponds to "Command to Camera" for WORD 0, 1 of LANC. As shown in FIG. 31, 04h of application No. and h of application .OPC indicate that this is a control command designated to the camera. FIG. 32 shows examples of the allocation of the application OPR 1.

The inquiry system corresponds to "Camera Status" for WORD 2, 3 of LANC. As shown in FIG. 33, 04h of application No. and 41h of application OPC indicate that this is a status inquiry command designated to the camera.

[5] Command -on/-off

Since LANC conducts communication periodically on every field, it is often used in such a way that a command is sent continuously during pressing of the key for remote control. Further, in LANC, the number of cycles of sending the command has a meaning. For example, there are such a case in which the command is made valid when identical commands are sent continuously for 2 fields and identical commands sent subsequently have no meanings till sending is disconnected and a case in which a meaning is given to continuous sending.

On the other hand, in the digital interface, since a command sent by 1 packet has a meaning, identical commands are not sent continuously. Accordingly, a command allocated with the identical code with that of the command defined in LANC shows "Command-on" (start of sending). A command having a meaning in continuous sending is separately allocated with a code indicative of "Command-off".

FIG. 34 shows a flow chart for processing a command of causing mode transition.

When a control command from a digital interface is received, a DIFcon judges whether the received command is a code of LANC or not step S1.

Then, if it is a LANC code, it is transferred to a MODEcon. The MODEcon determines a final mode referring to the mode transition table (step S4).

If it is judged that the command is not a LANC code, DIFcon converts the command to the code of the VCR mode and transfers the same to the MODEcon.

On the other hand, when a LANC command is received, the MODEcon detects the edge of the command (step S3), to determine the mode at the designation of transition based on the VCR mode and "Command-on", "Command-off" (step S4).

Accordingly, since the processing for detecting the edge by the MODEcon is not required by sending the LANC command on the digital interface in the form of "Command-on" or "Command-off" as described above, the processing can be simplified.

As has been described above specifically, according to the present invention, an original application using a control signal of a predetermined format containing an identification information indicative of the manufacturer of the equipment can be used also by other company, and the use can be permitted/inhibited on every application. Then, the application can be protected without using complicate encipherment.

As has been described above specifically, according to the present invention, a command drive type command set can be introduced in the digital interface without increasing the load for the internal processing of an equipment.

What is claimed is:

1. A method of controlling the operation of an electronic equipment, comprising the steps of:

providing a plurality of electronic equipments connected by way of a bus, said bus allowing for direct communication of information signals and control signals between any two or more of said electronic equipments;

transmitting a control signal of a predetermined format containing format information to said plurality of electronic equipments, said format information specifying whether said predetermined format is a standard format or is a vendor unique frame format indicating that interpretation of said control signal is possible only for an electronic equipment understanding said vendor unique frame format;

receiving said control signal by one or more of said plurality of electronic equipments;

determining at each of said one or more of said plurality of electronic devices whether said control signal of said predetermined format is a vendor unique frame format corresponding to each of said one or more of said plurality of electronic equipments based on said format information so that each of said one or more of said plurality of electronic equipment can interpret said control signal; and controlling each of said one or more of said plurality of electronic equipments based on a vendor unique command contained in said control signal when it is determined that said control signal of said predetermined format is a vendor unique frame format corresponding to each of said one or more of said plurality of electronic equipments so that each of said one or more of said plurality of electronic equipment can interpret said control signal.

2. The method of claim 1, wherein said control signal of said predetermined format further contains a vendor identification, said method further comprising the step of determining whether said vendor unique frame format corresponds to each of said one or more of said plurality of electronic equipments based upon said vendor identification.

3. The method of claim 2, wherein said vendor identification comprises 3 bytes of information.

4. The method of claim 1, wherein said format information comprises 4 bits of information.

5. An electric equipment connected to a bus along with other electronic equipments, said bus allowing transmission of a combination of a control signal and an information signal directly between any two or more of said electronic equipment and said other electronic equipments, said electronic equipment comprising:

a transmitter for transmitting a control signal of a predetermined format containing format information to said other electronic equipments, said format information specifying whether said predetermined format is a standard format or is a vendor unique frame format based on a vendor unique command contained within said control signal when said control signal of said predetermined format is a vendor unique frame format corresponding to said one of said other electronic equipments so that said one of said other electronic equipments can interpret said control signal.

6. The electric equipment of claim 5, wherein said control signal of said predetermined format further contains a vendor identification.

7. An electric equipment connected to a bus along with other electronic equipments, said bus allowing transmission of a combination of a control signal and an information signal directly between any two or more of said electronic equipment and said other electronic equipments, each of said electronic equipments comprising:

receiving means for receiving a control signal of a predetermined format containing format information specifying whether said predetermined format is a standard format or is a vendor unique frame format;

determining means for determining whether said control signal of said predetermined format is a standard format or is a vendor unique frame format corresponding to said electronic equipment based on said format information so that said electronic equipment can interpret said control signal; and controlling means for controlling said electronic equipment based on a vendor unique command contained in said control signal when it is determined that said control signal of said predetermined format is a vendor unique frame format for said electronic equipment so that said electronic equipment can interpret said control signal.

8. The electric equipment of claim 7, wherein said control signal of said predetermined format further contains a vendor identification, said electric equipment further comprising determining means for determining whether said vendor unique frame format corresponds to said electronic equipment based upon said vendor identification.

* * * * *